United States Patent
Li et al.

(10) Patent No.: US 8,009,923 B2
(45) Date of Patent: Aug. 30, 2011

(54) METHOD AND SYSTEM FOR MOTION ESTIMATION WITH MULTIPLE VECTOR CANDIDATES

(75) Inventors: Ge Li, Fremont, CA (US); Yanbin Yu, Fremont, CA (US)

(73) Assignee: Celestial Semiconductor, Inc., Beijing (CN)

( * ) Notice: Subject to any disclaimer, the term of this patent is extended or adjusted under 35 U.S.C. 154(b) by 1481 days.

(21) Appl. No.: 11/376,703

(22) Filed: Mar. 14, 2006

(65) Prior Publication Data

US 2007/0217511 A1    Sep. 20, 2007

(51) Int. Cl.
*G06K 9/36* (2006.01)
*G06K 9/46* (2006.01)

(52) U.S. Cl. ... 382/236; 382/238; 382/239; 375/240.14; 375/240.15; 375/240.16

(58) Field of Classification Search ............... 382/232, 382/236, 238–239; 375/240, 240.01, 240.12–240.17
See application file for complete search history.

(56) References Cited

U.S. PATENT DOCUMENTS

| | | | |
|---|---|---|---|
| 7,447,265 B2 * | 11/2008 | Ohira | 375/240.16 |
| 2004/0184542 A1 * | 9/2004 | Fujimoto | 375/240.16 |
| 2006/0280247 A1 * | 12/2006 | Chiou et al. | 375/240.16 |
| 2008/0212675 A1 * | 9/2008 | Ohgose et al. | 375/240.16 |

* cited by examiner

*Primary Examiner* — Dac Ha
*Assistant Examiner* — James M Perez
(74) *Attorney, Agent, or Firm* — Kilpatrick Townsend & Stockton LLP; Ardeshir Tabibi (57) ABSTRACT

A method and system for performing motion estimation for a frame associated with a video signal. The method includes receiving at least a reference frame, a first frame, and a second frame, and providing a first plurality of vectors. The first plurality of vectors intersects the first frame within a first block and intersects the reference frame within a first plurality of blocks respectively. Additionally, the method includes determining a second plurality of vectors based on at least information associated with the first plurality of vectors. The second plurality of vectors intersects the second frame within a second block and intersecting the reference frame at a plurality of locations. Moreover, the method includes processing information associated with the plurality of locations, and determining a plurality of search areas corresponding to the plurality of locations in the second frame.

21 Claims, 6 Drawing Sheets

METHOD AND SYSTEM FOR MOTION ESTIMATION WITH MULTIPLE VECTOR CANDIDATES

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to video signal processing. More specifically, the invention provides a method and system for motion estimation with multiple vector candidates. Merely by way of example, the invention is described as it applies to telescopic motion estimation, but it should be recognized that the invention has a broader range of applicability.

Video signal processing has been widely used for storing and transmitting visual information. The visual information can be represented by video data, which can be compressed in order to reduce size of data files. The compression can be performed under different formats, such as MPEG-1, MPEG-2, MPEG-4, H.264, and AVS.

Many of these formats can employ both lossless compression techniques and lossy compression techniques. For example, the lossless compression techniques may include variable length coding, run length coding, relative encoding, and arithmetic coding. In another example, the lossy compression techniques may include motion estimation with transformation and quantization of residual data.

Figure 1:
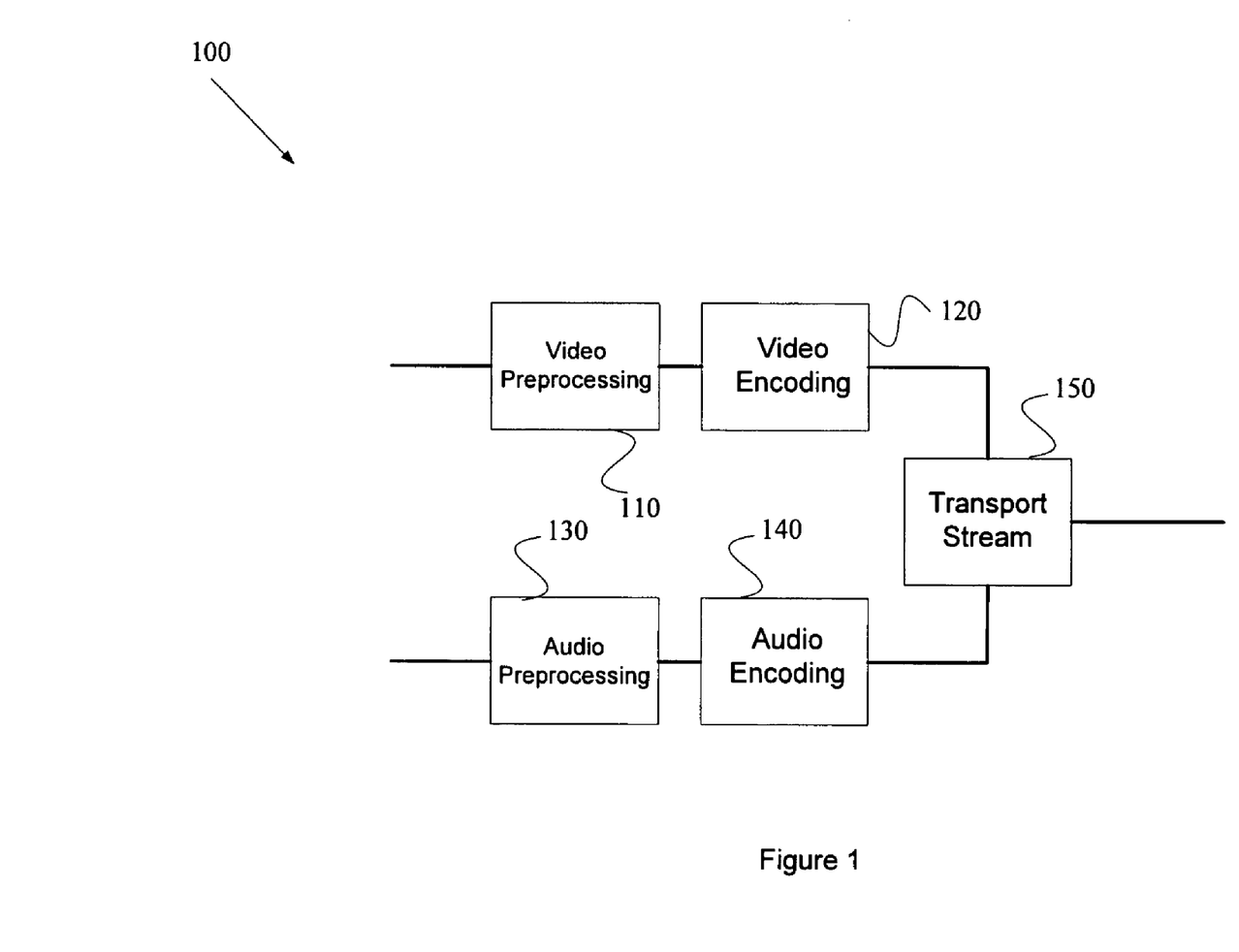
FIG. 1 is a simplified conventional system for video and audio compression.

FIG. 1 is a simplified conventional system for video and audio compression. The system 100 includes a video preprocessing system 110, a video encoding system 120, an audio preprocessing system 130, an audio encoding system 140, and a transport stream generator 150. As shown in FIG. 1, the video preprocessing system 110 receives a video signal, for example, from a video source. The video signal is preprocessed and then received by the video encoding system 120. For example, the encoding includes motion estimation and variable length coding. Additionally, the audio preprocessing system 130 receives an audio signal, for example, from an audio source. The audio signal is preprocessed and then received by the audio encoding system 140. The encoded video signal and the encoded audio signal are received by the transport stream generator 150. The transport stream generator 150 can multiplex the encoded video signal and the encoded audio signal, perform time synchronization, and generate one or more transport streams.

As implemented by the system 100, the motion estimation often is used to approximate an image frame by using data from another image frame. For example, the motion estimation includes frame segmentation, block matching, and vector coding. Among them, the block matching can be computationally intensive, and its results can significantly affect quality of video images that are compressed with motion estimation.

Hence it is highly desirable to improve techniques for motion estimation.

BRIEF SUMMARY OF THE INVENTION

The present invention relates in general to video signal processing. More specifically, the invention provides a method and system for motion estimation with multiple vector candidates. Merely by way of example, the invention is described as it applies to telescopic motion estimation, but it should be recognized that the invention has a broader range of applicability.

According to one embodiment of the present invention, a method for performing motion estimation for a frame associated with a video signal includes receiving at least a reference frame, a first frame, and a second frame, and providing a first plurality of vectors. The first plurality of vectors intersects the first frame within a first block and intersects the reference frame within a first plurality of blocks respectively. Additionally, the method includes determining a second plurality of vectors based on at least information associated with the first plurality of vectors. The second plurality of vectors intersects the second frame within a second block and intersecting the reference frame at a plurality of locations. Moreover, the method includes processing information associated with the plurality of locations, and determining a plurality of search areas corresponding to the plurality of locations in the second frame. Each of the plurality of locations is located within at least one of the plurality of search areas. Also, the method includes processing information associated with the second block and the plurality of search areas, and determining a second plurality of blocks within the plurality of search areas respectively based on at least information associated with the second block and the plurality of search areas. Each of the second plurality of blocks being located within at least one of the plurality of search areas. Additionally, the method includes processing information associated with the second plurality of blocks, selecting a third block from at least the second plurality of blocks based on at least information associated with the second plurality of blocks, and determining a motion vector based on at least information associated with the third block and the second block.

According to another embodiment, a method for performing motion estimation for a frame associated with a video signal includes receiving at least a reference frame, a first frame, and a second frame. The reference frame, the first frame, and the second frame are associated with a stream of frames related to a video signal. Additionally, the method includes providing a first plurality of vectors intersecting the first frame within a first block, and determining a second plurality of vectors based on at least information associated with the first plurality of vectors. The second plurality of vectors intersects the second frame within a second block and intersects the reference frame at a plurality of locations. Moreover, the method includes processing information associated with the plurality of locations, determining a plurality of search areas corresponding to the plurality of locations in the second frame respectively, processing information associated with the second block and the plurality of search areas, and determining a second plurality of blocks within the plurality of search areas respectively based on at least information associated with the second block and the plurality of search areas. Also, the method includes processing information associated with the second plurality of blocks, selecting a third block from at least the second plurality of blocks based on at least information associated with the second plurality of blocks, and determining a motion vector based on at least information associated with the third block and the second block. The first block is associated with a first location in the first frame, and the second block is associated with a second location in the second frame. The first location and the second location are the same.

According to yet another embodiment of the present invention, a computer program product includes a computer-readable medium including instructions for performing motion estimation for a frame associated with a video signal. The computer-readable medium includes one or more instructions for receiving at least a reference frame, a first frame, and a second frame and one or more instructions for providing a first plurality of vectors. The first plurality of vectors intersects the first frame within a first block and intersects the reference frame within a first plurality of blocks respectively. Additionally, the computer-readable medium includes one or more instructions for determining a second plurality of vectors based on at least information associated with the first plurality of vectors. The second plurality of vectors intersects the second frame within a second block and intersects the reference frame at a plurality of locations. Moreover, the computer-readable medium includes one or more instructions for processing information associated with the plurality of locations, and one or more instructions for determining a plurality of search areas corresponding to the plurality of locations in the second frame. Each of the plurality of locations is located within at least one of the plurality of search areas. Also, the computer-readable medium includes one or more instructions for processing information associated with the second block and the plurality of search areas, and one or more instructions for determining a second plurality of blocks within the plurality of search areas respectively based on at least information associated with the second block and the plurality of search areas. Each of the second plurality of blocks is located within at least one of the plurality of search areas. Additionally, the computer-readable medium includes one or more instructions for processing information associated with the second plurality of blocks, one or more instructions for selecting a third block from at least the second plurality of blocks based on at least information associated with the second plurality of blocks, and one or more instructions for determining a motion vector based on at least information associated with the third block and the second block.

Many benefits are achieved by way of the present invention over conventional techniques. For example, certain embodiments of the present invention use two or more motion vector candidates for motion estimation scheme. For example, the motion estimation scheme is telescopic motion estimation using normal full search or other search mechanism in search areas. Some embodiments of the present invention use two or more motion vector candidates that have significant distance between each other. Certain embodiments of the present invention use two or more motion vector candidates for various motion compensation modes. For example, the block size for block matching can vary from one application to another application. In another example, the number of reference frames can be one or more. In yet another example, the size of search areas can vary from one application to another application.

Some embodiments of the present invention can provide motion estimation with multiple vector candidates under MPEG-1, MPEG-2, MPEG-4, H.264, and AVS. Certain embodiments of the present invention can reduce bit size for encoding a block at a given RD. Some embodiments of the present invention can optimize encoding costs based on rate distortion theorem. Certain embodiments of the present invention provide two or more scaled vector candidates based on two or more vector candidates for a frame already encoded. The use of multiple scaled vector candidates require limited amount of memory but can significantly improve estimation performance. Some embodiments of the present invention use more than one reference frame. For example, a future reference frame, in addition to a past reference frame, is also used to increase estimation performance. The future reference frame is encoded before a current frame is encoded, and the encoded future reference frame is used for motion estimation for the current frame if the corresponding delay is acceptable in an application, such as for non-real time encoder. In another example, two past reference frames are used for motion estimation for a current frame.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to video signal processing. More specifically, the invention provides a method and system for motion estimation with multiple vector candidates. Merely by way of example, the invention is described as it applies to telescopic motion estimation, but it should be recognized that the invention has a broader range of applicability.

In many applications, the conventional motion estimation includes telescopic motion estimation. For example, the telescopic motion estimation first determines a motion vector between a reference frame and a current frame. Then the determined motion vector is used to generate a scaled motion vector for a following frame. The scaled motion vector can help reducing the search area for block matching between the reference frame and the following frame. The result of block matching is used to determine the motion vector for this following frame.

As discussed above, the conventional telescopic motion estimation often uses only one motion vector between a block of the reference frame and a block of the current frame. The single motion vector is then used to generate a single scaled motion vector, which can determine a search area on the reference frame in order to match a block on the reference frame with another block on the following frame. Within the search area, a good match between blocks can be difficult to obtain.

As an example, a block in the current frame may have two good matching candidates in the reference frame with two different motion vectors. One motion vector is associated with the optimized value for sum of absolute differences (SAD), and corresponds to a first scaled motion vector for the following frame. The other motion vector is associated with the sub-optimized SAD value, and corresponds to a second scaled motion vector for the following frame. For the following frame, the best matching may be obtained from the search area determined by the second scaled motion vector, instead of the first scaled motion vector. If the telescopic motion estimation uses only the first scaled motion estimation, the block matching sometimes is not effective.

Figure 2:
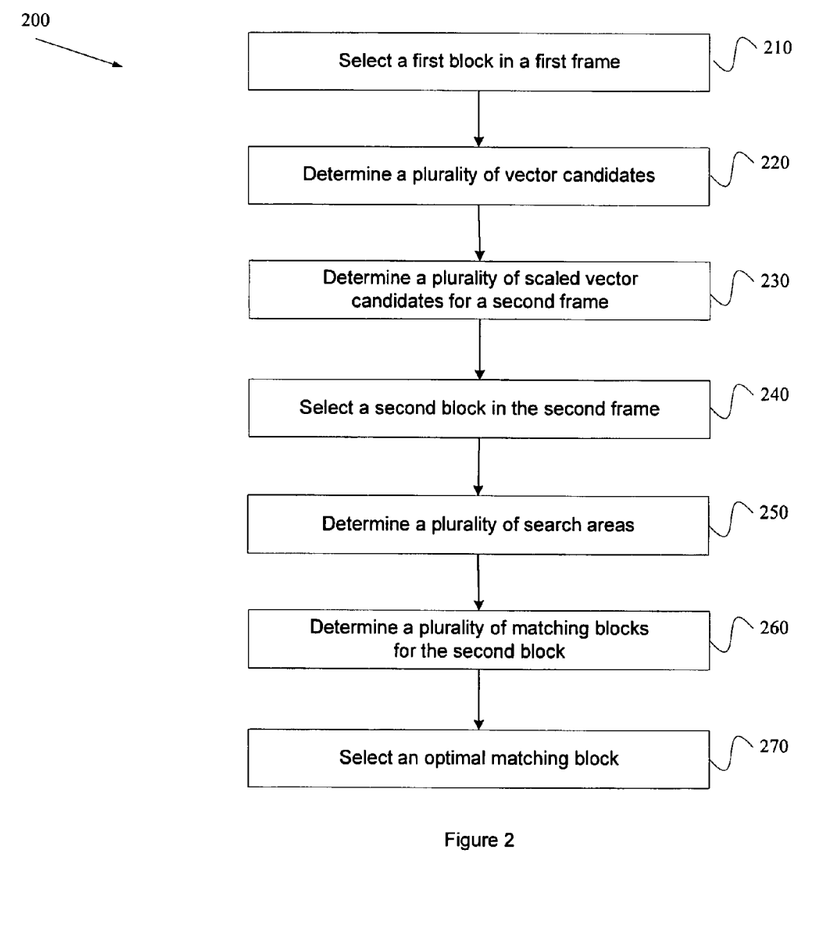
FIG. 2 is a simplified method for motion estimation with multiple vector candidates according to an embodiment of the present invention.

FIG. 2 is a simplified method for motion estimation with multiple vector candidates according to an embodiment of the present invention. This diagram is merely an example, which should not unduly limit the scope of the claims. One of ordinary skill in the art would recognize many variations, alternatives, and modifications. The method 200 includes a process 210 for selecting a first block in a first frame, a process 220 for determining a plurality of vector candidates, a process 230 for determining a plurality of scaled vector candidates for a second frame, a process 240 for selecting a second block in the second frame, a process 250 for determining a plurality of search areas, a process 260 for determining a plurality of matching blocks for the second block, and a process 270 for selecting an optimal matching block. Although the above has been shown using a selected sequence of processes, there can be many alternatives, modifications, and variations. For example, some of the processes may be expanded and/or combined. Other processes may be inserted to those noted above. Depending upon the embodiment, the specific sequence of processes may be interchanged with others replaced. As an example, some or all processes of the method 200 are performed by a computer or a processor directed by a code. In another example, some or all processes of the method 200 are performed according to instructions included by a computer-readable medium in a computer program product. Further details of these processes are found throughout the present specification and more particularly below.

At the process 210, a first block is selected from a first frame. For example, the first frame is a frame to be inter-coded. As another example, the first frame is segmented into a first plurality of blocks. In one embodiment, each block is 16 by 16 pixels, 16 by 8 pixels, 8 by 8 pixels, or 4 by 4 pixels in size. Out of the first plurality of blocks, one block is selected as the first block.

Figure 3:
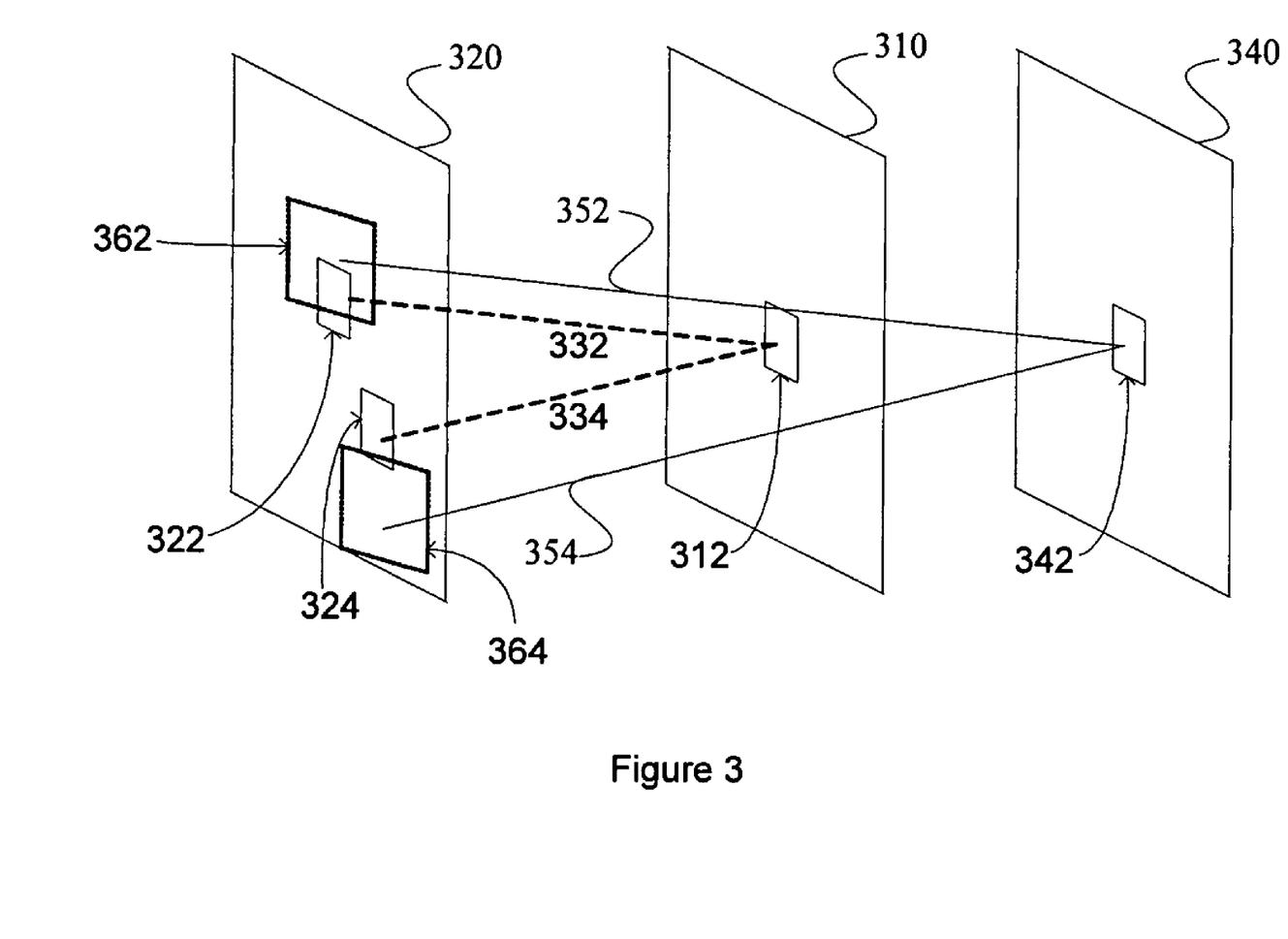
FIG. 3 is a simplified diagram showing motion estimation with multiple vector candidates according to an embodiment of the present invention.

FIG. 3 is a simplified diagram showing motion estimation with multiple vector candidates according to an embodiment of the present invention. This diagram is merely an example, which should not unduly limit the scope of the claims. One of ordinary skill in the art would recognize many variations, alternatives, and modifications. As an example, the first frame is a frame 310, and the selected first block is a block 312.

At the process 220, a plurality of vector candidates is determined with respect to a reference frame. For example, the reference frame is an inter-coded frame. In another example, the reference frame is an intra-coded frame. In yet another example, the reference frame is encoded prior to the first frame being encoded. In yet another example, the reference frame describes an image that is present earlier than the image described by the first frame in the stream of frames.

Figure 4:
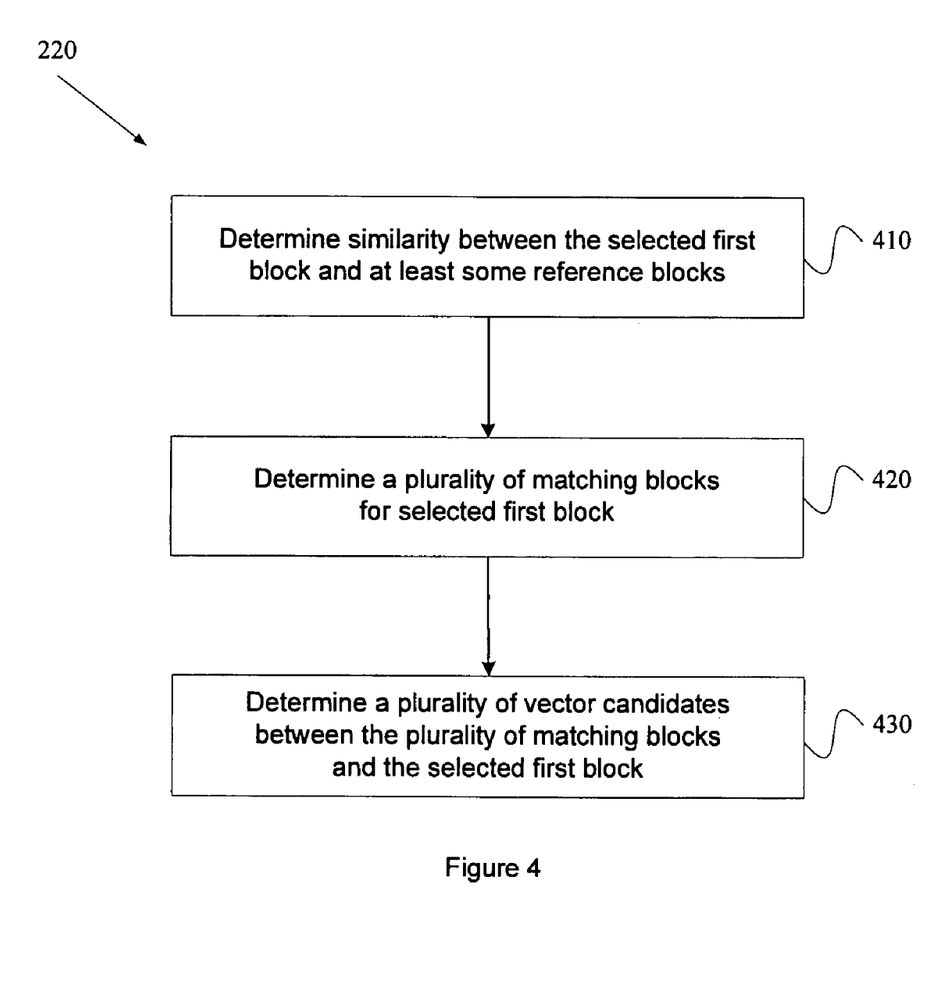
FIG. 4 shows a simplified process for determining a plurality of vector candidates for motion estimation with multiple vector candidates according to an embodiment of the present invention.

FIG. 4 shows a simplified process for determining a plurality of vector candidates for motion estimation with multiple vector candidates according to an embodiment of the present invention. This diagram is merely an example, which should not unduly limit the scope of the claims. One of ordinary skill in the art would recognize many variations, alternatives, and modifications. The process 220 includes process 410 for determining similarity between the selected first block and at least some reference blocks, process 420 for determining a plurality of matching blocks for selected first block, and process 430 for determining a plurality of vector candidates between the plurality of matching blocks and the selected first block.

At the process 410, the similarity between the selected first block and at least some reference blocks in the reference frame is determined. For example, the block similarity is measured by SAD. In another example, the block similarity is measured by rate distortion (RD). In one embodiment, the at least some reference blocks include some or all blocks in the entire reference frame. In another embodiment, the at least some reference blocks include some or all blocks in at least part of the reference frame. Between the selected first block and each of the at least some reference blocks, a degree of similarity is determined. For example, the degree of similarity is described in terms of SAD and/or RD.

At the process 420, a plurality of matching blocks is determined based on the degrees of similarities between the selected first block and the at least some reference blocks. For example, the plurality of matching blocks are the blocks most similar to the selected first block among the at least some reference blocks. In one embodiment, the plurality of matching blocks includes two matching blocks, which are most similar to the selected first block in terms of SAD and/or RD.

Figure 5:
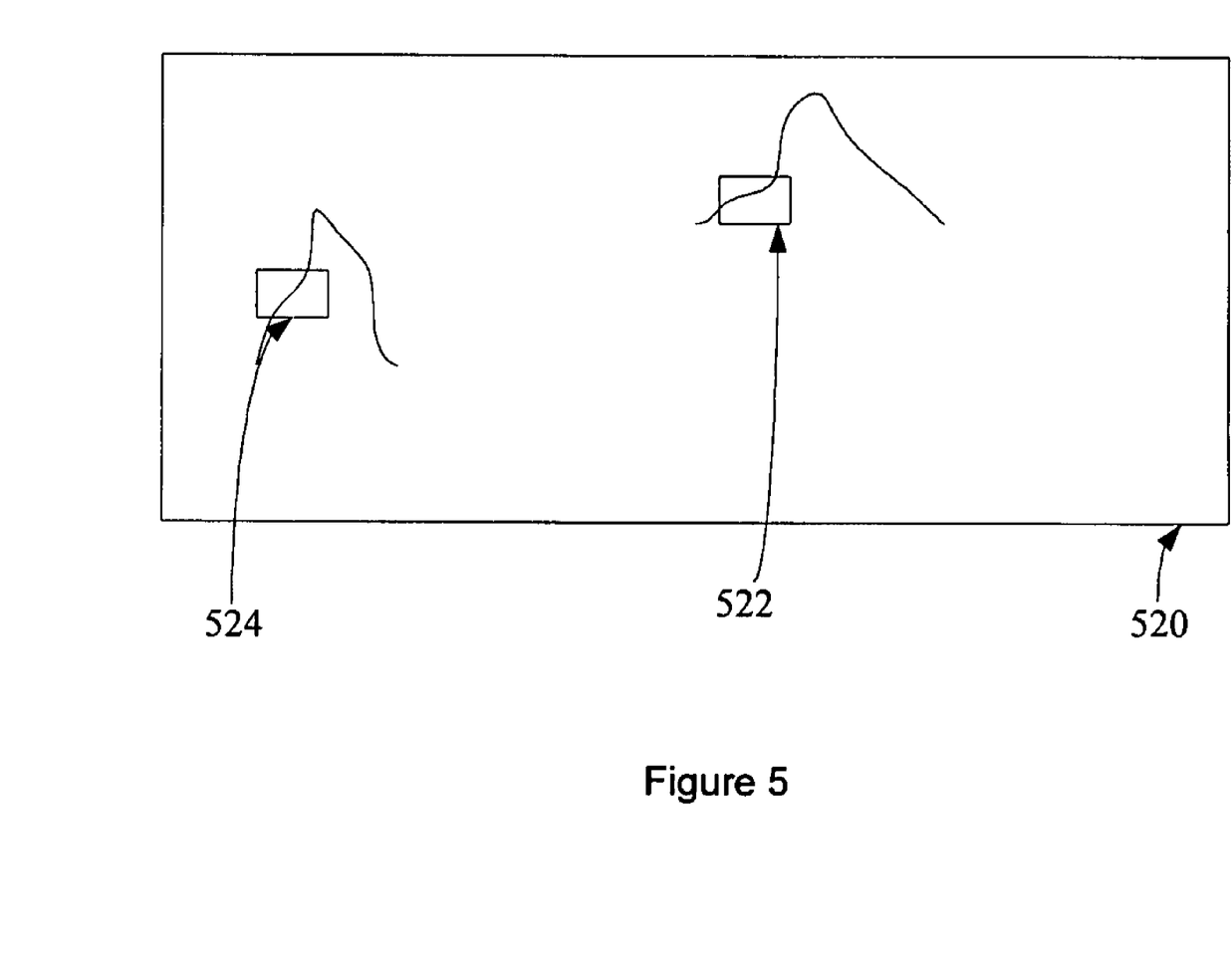
FIG. 5 is a simplified diagram showing a plurality of matching blocks for motion estimation with multiple vector candidates according to an embodiment of the present invention.

FIG. 5 is a simplified diagram showing a plurality of matching blocks for motion estimation with multiple vector candidates according to an embodiment of the present invention. This diagram is merely an example, which should not unduly limit the scope of the claims. One of ordinary skill in the art would recognize many variations, alternatives, and modifications. As shown in FIG. 5, the plurality of matching blocks includes blocks 524 and 522 in a reference frame 520. The block 522 is the second most similar matching block in terms of SAD, but the most similar matching block in terms of RD. Additionally, the block 524 is the most similar matching block in terms of SAD, but the second most similar matching block in terms of RD.

At the process 430, a plurality of vector candidates is determined between the plurality of matching blocks and the selected first block. For example, each of the plurality of vector candidates is a vector that describes the location of a corresponding one of the plurality of matching blocks with respect to the selected first block.

For example, as shown in FIG. 3, the reference frame is a frame 320. In the frame 320, the plurality of matching blocks includes blocks 322 and 324 that correspond to the selected first block 312. The location of the matching block 322 with respect to the selected first block 312 is shown by the vector candidate 332, and the location of the matching block 324 with respect to the selected first block 312 is shown by the vector candidate 334. In one embodiment, the reference frame 320 is the reference frame 520 as shown in FIG. 5.

Returning to FIG. 2, at the process 230, a plurality of scaled vector candidates is determined for a second frame. For example, the second frame is a frame to be inter-coded. In another example, the first frame is encoded prior to the second frame being encoded. In yet another example, the first frame describes an image that is present earlier than the image described by the second frame in the stream of frames.

In one embodiment, the plurality of scaled vector candidates is parallel to the plurality of vector candidates respectively. In another embodiment, the plurality of scaled vector candidates each have a length that enables the corresponding scaled vector candidate to start at the second frame and end at the reference frame. For example, as shown in FIG. 3, the second frame is a frame 340. For the frame 340, a scaled vector candidate 352 is parallel to the vector candidate 332, and another scaled vector 354 is parallel to the vector candidate 334.

At the process 240, a second block is selected from the second frame. For example, the second frame is segmented into a second plurality of blocks. In one embodiment, each block is 16 by 16 pixels, 16 by 8 pixels, 8 by 8 pixels, or 4 by 4 pixels in size. Out of the second plurality of blocks, one block is selected as the second block. For example, the selected second block has a location in the second frame that is same as the location for the selected first block in the first frame. In another example, as shown in FIG. 3, the second frame is the frame 340, and the selected second block is a block 342.

At the process 250, a plurality of search areas is determined in the reference frame. For example, the plurality of scaled vector candidates is moved to intersect the second frame at the selected second block and intersect the reference frame at a plurality of reference locations respectively. Each of the plurality of scaled vector candidates corresponds to one of the plurality of reference locations. Based on the plurality of reference locations, the plurality of search areas is determined in the reference frame respectively. For example, each of the plurality of search areas does not overlap with any other of the plurality of search areas. In another example, at least one of the plurality of search areas overlaps with at least another of the plurality of search areas.

Each of the plurality of search areas corresponds to one of the plurality of reference locations. For example, each of the plurality of reference locations is located within, such as at the center of, the corresponding one of the plurality of search areas. In another example, each search area is 32 by 32 pixels in size. According to one embodiment, as shown in FIG. 3, the scaled vector candidate 352 corresponds to a search area 362 in the reference frame 320, and the scaled vector candidate 362 corresponds to a search area 364 in the reference frame 320.

At the process 260, a plurality of matching blocks is determined for the selected second frame. For example, each of the plurality of matching blocks corresponds to one of the plurality of search areas. In another example, within each of the plurality of search areas, one of the plurality of matching blocks is determined.

In one embodiment, within one of the plurality of search areas, the similarity between the selected second block and at least some reference blocks in the search area is determined. For example, the block similarity is measured by SAD. In another example, the block similarity is measured by rate distortion (RD). The at least some reference blocks include some or all blocks in the search area. Between the selected second block and each of the at least some reference blocks, a degree of similarity is determined. For example, the degree of similarity is described in terms of SAD and/or RD.

Additionally, within the search area, a matching block is determined based on the degrees of similarities between the selected second block and the at least some reference blocks according to one embodiment of the present invention. For example, the matching block is the block most similar to the selected second block among the at least some reference blocks. In another example, the matching block is most similar to the selected second block in terms of SAD and/or RD.

At the process 270, an optimal matching block is selected from the plurality of matching blocks for the selected second frame. As discussed above, each of the plurality of matching blocks for the selected second frame is associated with a degree of similarity. Among the plurality of matching blocks, the block that is most similar to the selected second block is determined as the optimal matching block. For example, the optimal matching block is used to determine the motion vector for the reference frame with respect to the selected second frame. In another example, the motion vector is used, among others, for encoding the second frame.

As discussed above and further emphasized here, FIGS. 2-4 are merely examples, which should not unduly limit the scope of the claims. One of ordinary skill in the art would recognize many variations, alternatives, and modifications. For example, if an object makes a non-linear movement such as a rotation, the plurality of search areas determined at the process 250 becomes lager in comparison with the plurality of search areas determined at the process 250 for an object that does not make any non-linear movement. In another example, if an object makes a non-linear movement such as a rotation, the plurality of scaled vector candidates determined at the process 230 results from non-linear scaling of the plurality of vector candidates determined at the process 220. In one embodiment, the plurality of scaled vector candidates is not parallel with the plurality of vector candidates respectively. In yet another example, the reference frame describes an image that is present later than the image described by the first frame in the stream of frames. In yet another example, the first frame describes an image that is present later than the image described by the second frame in the stream of frames.

Figure 6:
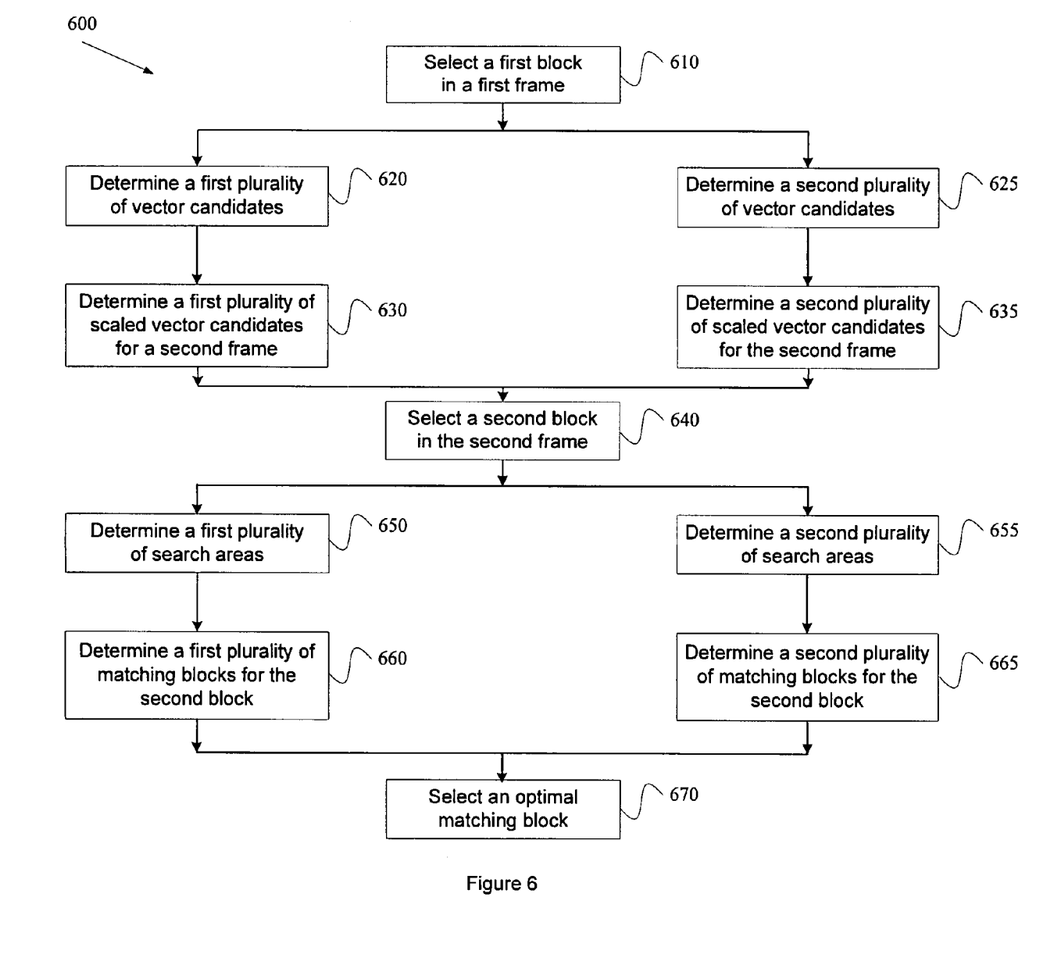
FIG. 6 is a simplified method for motion estimation with multiple vector candidates according to another embodiment of the present invention.

FIG. 6 is a simplified method for motion estimation with multiple vector candidates according to another embodiment of the present invention. This diagram is merely an example, which should not unduly limit the scope of the claims. One of ordinary skill in the art would recognize many variations, alternatives, and modifications. The method 600 includes a process 610 for selecting a first block in a first frame, a process 620 for determining a first plurality of vector candidates, a process 625 for determining a second plurality of vector candidates, a process 630 for determining a first plurality of scaled vector candidates for a second frame, a process 635 for determining a second plurality of scaled vector candidates for the second frame, a process 640 for selecting a second block in the second frame, a process 650 for determining a first plurality of search areas, a process 655 for determining a second plurality of search areas, a process 660 for determining a first plurality of matching blocks for the second block, a process 665 for determining a second plurality of matching blocks for the second block, and a process 670 for selecting an optimal matching block. Although the above has been shown using a selected sequence of processes, there can be many alternatives, modifications, and variations. For example, some of the processes may be expanded and/or combined. Other processes may be inserted to those noted above. Depending upon the embodiment, the specific sequence of processes may be interchanged with others replaced. As an example, some or all processes of the method 600 are performed by a computer or a processor directed by a code. In another example, some or all processes of the method 600 are performed according to instructions included by a computer-readable medium in a computer program product.

Further details of these processes are found throughout the present specification and more particularly below.

At the process 610, a first block is selected from a first frame. For example, the first frame is a frame to be inter-coded. As another example, the first frame is segmented into a first plurality of blocks. In one embodiment, each block is 16 by 16 pixels, 16 by 8 pixels, 8 by 8 pixels, or 4 by 4 pixels in size. Out of the first plurality of blocks, one block is selected as the first block.

At the process 620, a first plurality of vector candidates is determined with respect to a first reference frame. For example, the first reference frame is an inter-coded frame. In another example, the first reference frame is an intra-coded frame. In yet another example, the first reference frame is encoded prior to the first frame being encoded. In yet another example, the first reference frame describes an image that is present earlier than the image described by the first frame in the stream of frames.

According to one embodiment, the process 620 includes determining similarity between the selected first block and at least some reference blocks in the first reference frame, determining a first plurality of matching blocks for the selected first block based on degrees of similarities between the selected first block and the at least some reference blocks, and determining a first plurality of vector candidates between the first plurality of matching blocks and the selected first block. According to another embodiment, the process 620 is substantially similar to the process 220 as described in FIG. 4.

At the process 625, a second plurality of vector candidates is determined with respect to a second reference frame. For example, the second reference frame is an inter-coded frame. In another example, the second reference frame is an intra-coded frame. In yet another example, the second reference frame is encoded prior to the first frame being encoded. In yet another example, the second reference frame describes an image that is present later than the image described by the first frame in the stream of frames. In yet another example, the second reference frame describes an image that is present earlier than the image described by the first frame in the stream of frames.

According to one embodiment, the process 625 includes determining similarity between the selected first block and at least some reference blocks in the second reference frame, determining a second plurality of matching blocks for the selected first block based on degrees of similarities between the selected first block and the at least some reference blocks, and determining a second plurality of vector candidates between the second plurality of matching blocks and the selected first block. According to another embodiment, the process 625 is substantially similar to the process 220 as described in FIG. 4.

At the process 630, a first plurality of scaled vector candidates is determined for a second frame. For example, the second frame is a frame to be inter-coded. In another example, the first frame is encoded prior to the second frame being encoded. In yet another example, the first frame describes an image that is present earlier than the image described by the second frame in the stream of frames. In one embodiment, the first plurality of scaled vector candidates is parallel to the first plurality of vector candidates respectively. In another embodiment, the first plurality of scaled vector candidates each have a length that enables the corresponding scaled vector candidate to start at the second frame and end at the first reference frame.

At the process 635, a second plurality of scaled vector candidates is determined for a second frame. In one embodiment, the second plurality of scaled vector candidates is parallel to the second plurality of vector candidates respectively. In another embodiment, the second plurality of scaled vector candidates each have a length that enables the corresponding scaled vector candidate to start at the second frame and end at the second reference frame.

At the process 640, a second block is selected from the second frame. For example, the second frame is segmented into a second plurality of blocks. In one embodiment, each block is 16 by 16 pixels, 16 by 8 pixels, 8 by 8 pixels, or 4 by 4 pixels in size. Out of the second plurality of blocks, one block is selected as the second block. For example, the selected second block has a location in the second frame that is same as the location for the selected first block in the first frame.

At the process 650, a first plurality of search areas is determined in the first reference frame. For example, the first plurality of scaled vector candidates is moved to intersect the second frame at the selected second block and intersect the first reference frame at a first plurality of reference locations respectively. Each of the first plurality of scaled vector candidates corresponds to one of the first plurality of reference locations. Based on the first plurality of reference locations, the first plurality of search areas is determined in the first reference frame respectively. For example, each of the first plurality of search areas do not overlap with any other of the first plurality of search areas. In another example, at least one of the first plurality of search areas overlaps with at least another of the first plurality of search areas. Each of the first plurality of search areas corresponds to one of the first plurality of reference locations. For example, each of the first plurality of reference locations is located within, such as at the center of, the corresponding one of the first plurality of search areas. In another example, each search area is 16 by 16 pixels in size.

At the process 655, a second plurality of search areas is determined in the second reference frame. For example, the second plurality of scaled vector candidates is moved to intersect the second frame at the selected second block and intersect the second reference frame at a second plurality of reference locations respectively. Each of the second plurality of scaled vector candidates corresponds to one of the second plurality of reference locations. Based on the second plurality of reference locations, the second plurality of search areas is determined in the second reference frame respectively. For example, each of the second plurality of search areas do not overlap with any other of the second plurality of search areas. In another example, at least one of the second plurality of search areas overlaps with at least another of the second plurality of search areas. Each of the second plurality of search areas corresponds to one of the second plurality of reference locations. For example, each of the second plurality of reference locations is located within, such as at the center of, the corresponding one of the second plurality of search areas. In another example, each search area is 16 by 16 pixels in size.

At the process 660, a first plurality of matching blocks is determined for the selected second frame. For example, each of the first plurality of matching blocks corresponds to one of the first plurality of search areas. In another example, within each of the first plurality of search areas, one of the first plurality of matching blocks is determined.

In one embodiment, within one of the first plurality of search areas, the similarity between the selected second block and at least some reference blocks in the search area is determined. For example, the block similarity is measured by SAD. In another example, the block similarity is measured by rate distortion (RD). The at least some reference blocks include some or all blocks in the search area. Between the selected second block and each of the at least some reference blocks, a degree of similarity is determined. For example, the degree of similarity is described in terms of SAD and/or RD.

Additionally, within the search area, a matching block is determined based on the degrees of similarities between the selected second block and the at least some reference blocks according to one embodiment of the present invention. For example, the matching block is the block most similar to the selected second block among the at least some reference blocks. In another example, the matching block is most similar to the selected second block in terms of SAD and/or RD.

At the process 665, a second plurality of matching blocks is determined for the selected second frame. For example, each of the second plurality of matching blocks corresponds to one of the second plurality of search areas. In another example, within each of the second plurality of search areas, one of the second plurality of matching blocks is determined.

In one embodiment, within one of the second plurality of search areas, the similarity between the selected second block and at least some reference blocks in the search area is determined. For example, the block similarity is measured by SAD. In another example, the block similarity is measured by rate distortion (RD). The at least some reference blocks include some or all blocks in the search area. Between the selected second block and each of the at least some reference blocks, a degree of similarity is determined. For example, the degree of similarity is described in terms of SAD and/or RD.

Additionally, within the search area, a matching block is determined based on the degrees of similarities between the selected second block and the at least some reference blocks according to one embodiment of the present invention. For example, the matching block is the block most similar to the selected second block among the at least some reference blocks. In another example, the matching block is most similar to the selected second block in terms of SAD and/or RD.

At the process 670, an optimal matching block is selected from the first plurality of matching blocks and the second plurality of matching blocks for the selected second frame. As discussed above, each of the first plurality of matching blocks for the selected second frame is associated with a degree of similarity, and each of the second plurality of matching blocks for the selected second frame is also associated with a degree of similarity. Among the first plurality of matching blocks and the second plurality of matching blocks, the block that is most similar to the selected second block is determined as the optimal matching block. For example, the optimal matching block is used to determine the motion vector for the first reference frame or the second reference frame with respect to the selected second frame. In another example, the motion vector is used, among others, for encoding the second frame.

According to another embodiment of the present invention, a method for performing motion estimation for a frame associated with a video signal includes receiving at least a reference frame, a first frame, and a second frame, and providing a first plurality of vectors. The first plurality of vectors intersects the first frame within a first block and intersects the reference frame within a first plurality of blocks respectively. Additionally, the method includes determining a second plurality of vectors based on at least information associated with the first plurality of vectors. The second plurality of vectors intersects the second frame within a second block and intersecting the reference frame at a plurality of locations. Moreover, the method includes processing information associated with the plurality of locations, and determining a plurality of search areas corresponding to the plurality of locations in the second frame. Each of the plurality of locations is located within at least one of the plurality of search areas. Also, the method includes processing information associated with the second block and the plurality of search areas, and determining a second plurality of blocks within the plurality of search areas respectively based on at least information associated with the second block and the plurality of search areas. Each of the second plurality of blocks being located within at least one of the plurality of search areas. Additionally, the method includes processing information associated with the second plurality of blocks, selecting a third block from at least the second plurality of blocks based on at least information associated with the second plurality of blocks, and determining a motion vector based on at least information associated with the third block and the second block. For example, the method is implemented according to the method 200 and/or the method 600.

According to yet another embodiment, a method for performing motion estimation for a frame associated with a video signal includes receiving at least a reference frame, a first frame, and a second frame. The reference frame, the first frame, and the second frame are associated with a stream of frames related to a video signal. Additionally, the method includes providing a first plurality of vectors intersecting the first frame within a first block, and determining a second plurality of vectors based on at least information associated with the first plurality of vectors. The second plurality of vectors intersects the second frame within a second block and intersects the reference frame at a plurality of locations. Moreover, the method includes processing information associated with the plurality of locations, determining a plurality of search areas corresponding to the plurality of locations in the second frame respectively, processing information associated with the second block and the plurality of search areas, and determining a second plurality of blocks within the plurality of search areas respectively based on at least information associated with the second block and the plurality of search areas. Also, the method includes processing information associated with the second plurality of blocks, selecting a third block from at least the second plurality of blocks based on at least information associated with the second plurality of blocks, and determining a motion vector based on at least information associated with the third block and the second block. The first block is associated with a first location in the first frame, and the second block is associated with a second location in the second frame. The first location and the second location are the same. For example, the method is implemented according to the method 200 and/or the method 600.

According to yet another embodiment of the present invention, a computer program product includes a computer-readable medium including instructions for performing motion estimation for a frame associated with a video signal. The computer-readable medium includes one or more instructions for receiving at least a reference frame, a first frame, and a second frame and one or more instructions for providing a first plurality of vectors. The first plurality of vectors intersects the first frame within a first block and intersects the reference frame within a first plurality of blocks respectively. Additionally, the computer-readable medium includes one or more instructions for determining a second plurality of vectors based on at least information associated with the first plurality of vectors. The second plurality of vectors intersects the second frame within a second block and intersects the reference frame at a plurality of locations. Moreover, the computer-readable medium includes one or more instructions for processing information associated with the plurality of locations, and one or more instructions for determining a plurality of search areas corresponding to the plurality of locations in the second frame. Each of the plurality of locations is located within at least one of the plurality of search areas. Also, the computer-readable medium includes one or more instructions for processing information associated with the second block and the plurality of search areas, and one or more instructions for determining a second plurality of blocks within the plurality of search areas respectively based on at least information associated with the second block and the plurality of search areas. Each of the second plurality of blocks is located within at least one of the plurality of search areas. Additionally, the computer-readable medium includes one or more instructions for processing information associated with the second plurality of blocks, one or more instructions for selecting a third block from at least the second plurality of blocks based on at least information associated with the second plurality of blocks, and one or more instructions for determining a motion vector based on at least information associated with the third block and the second block. For example, the computer program product includes the computer-readable medium including instructions for performing the method 200 and/or the method 600.

The present invention has various advantages. Certain embodiments of the present invention use two or more motion vector candidates for motion estimation scheme. For example, the motion estimation scheme is telescopic motion estimation using normal full search or other search mechanism in search areas. Some embodiments of the present invention use two or more motion vector candidates that have significant distance between each other. Certain embodiments of the present invention use two or more motion vector candidates for various motion compensation modes. For example, the block size for block matching can vary from one application to another application. In another example, the number of reference frames can be one or more. In yet another example, the size of search areas can vary from one application to another application.

Some embodiments of the present invention can provide motion estimation with multiple vector candidates under MPEG-1, MPEG-2, MPEG-4, H.264, and AVS. Certain embodiments of the present invention can reduce bit size for encoding a block at a given RD. Some embodiments of the present invention can optimize encoding costs based on rate distortion theorem. Certain embodiments of the present invention provide two or more scaled vector candidates based on two or more vector candidates for a frame already encoded. The use of multiple scaled vector candidates require limited amount of memory but can significantly improve estimation performance. Some embodiments of the present invention use more than one reference frame. For example, a future reference frame, in addition to a past reference frame, is also used to increase estimation performance. The future reference frame is encoded before a current frame is encoded, and the encoded future reference frame is used for motion estimation for the current frame if the corresponding delay is acceptable in an application, such as for non-real time encoder. In another example, two past reference frames are used for motion estimation for a current frame.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for performing motion estimation for a frame associated with a video signal, the method comprising:
   receiving at least a reference frame, a first frame, and a second frame;
   providing a first plurality of vectors, the first plurality of vectors intersecting the first frame within a first block and intersecting the reference frame within a first plurality of blocks respectively;
   determining a second plurality of vectors based on at least information associated with the first plurality of vectors, the second plurality of vectors intersecting the second frame within a second block and intersecting the reference frame at a plurality of locations;
   processing information associated with the plurality of locations;
   determining a plurality of search areas corresponding to the plurality of locations in the second frame, each of the plurality of locations being located within at least one of the plurality of search areas;
   processing information associated with the second block and the plurality of search areas;
   determining a second plurality of blocks within the plurality of search areas respectively based on at least information associated with the second block and the plurality of search areas, each of the second plurality of blocks being located within at least one of the plurality of search areas;
   processing information associated with the second plurality of blocks;
   selecting a third block from at least the second plurality of blocks based on at least information associated with the second plurality of blocks; and
   determining a motion vector based on at least information associated with the third block and the second block.

2. The method of claim 1 wherein each of the second plurality of vectors follows parallel paths with one of the first plurality of vectors between the second frame and the reference frame.

3. A method for performing motion estimation for a frame associated with a video signal, the method comprising:
   receiving at least a reference frame, a first frame, and a second frame;
   providing a first plurality of vectors, the first plurality of vectors intersecting the first frame within a first block and intersecting the reference frame within a first plurality of blocks respectively;
   determining a second plurality of vectors based on at least information associated with the first plurality of vectors, the second plurality of vectors intersecting the second frame within a second block and intersecting the reference frame at a plurality of locations;
   processing information associated with the plurality of locations;
   determining a plurality of search areas corresponding to the plurality of locations in the second frame, each of the plurality of locations being located within at least one of the plurality of search areas;
   processing information associated with the second block and the plurality of search areas;
   determining a second plurality of blocks within the plurality of search areas respectively based on at least information associated with the second block and the plurality of search areas, each of the second plurality of blocks being located within at least one of the plurality of search areas;

processing information associated with the second plurality of blocks;
selecting a third block from at least the second plurality of blocks based on at least information associated with the second plurality of blocks;
determining a motion vector based on at least information associated with the third block and the second block;
wherein the reference frame includes a plurality of reference blocks; and
wherein the providing the first plurality of vectors comprises:
processing information associated with the plurality of reference blocks and the first block;
determining a plurality of indicators for the plurality of reference blocks respectively based on at least information associated with the plurality of reference blocks and the first block, the plurality of indicators indicating degrees of similarity between the first block and the plurality of reference blocks respectively;
processing information associated with the plurality of indicators and the plurality of reference blocks;
determining at least two blocks most similar to the first block among all of the plurality of reference blocks based on at least information associated with the plurality of indicators; and
selecting the first plurality of blocks from the plurality of reference blocks, the first plurality of blocks including the two blocks.

4. The method of claim 3 wherein the reference frame, the first frame, and the second frame are associated with a stream of frames related to a video signal.

5. The method of claim 3 wherein:
the first block is associated with a first location in the first frame;
the second block is associated with a second location in the second frame;
the first location and the second location are the same.

6. The method of claim 3 wherein at least one of the second plurality of vectors is not parallel with anyone of the first plurality of vectors.

7. The method of claim 3 wherein the reference frame includes a plurality of reference blocks.

8. The method of claim 3 wherein the plurality of indicators is associated with sum of absolute differences.

9. The method of claim 3 wherein the plurality of indicators is associated with rate distortion.

10. The method of claim 3 wherein each of the plurality of search areas includes a plurality of reference blocks.

11. The method of claim 3 wherein the second plurality of blocks is associated with a plurality of indicators respectively, the plurality of indicators indicating degrees of similarity between the second block and the second plurality of blocks respectively.

12. The method of claim 11 wherein the plurality of indicators is associated with sum of absolute differences.

13. The method of claim 11 wherein the plurality of indicators is associated with rate distortion.

14. The method of claim 3 wherein each of the plurality of search areas does not overlap with any other of the plurality of search areas.

15. The method of claim 3 wherein at least one of the plurality of search areas overlaps with at least another of the plurality of search areas.

16. A method for performing motion estimation for a frame associated with a video signal, the method comprising:
receiving at least a reference frame, a first frame, and a second frame;
providing a first plurality of vectors, the first plurality of vectors intersecting the first frame within a first block and intersecting the reference frame within a first plurality of blocks respectively;
determining a second plurality of vectors based on at least information associated with the first plurality of vectors, the second plurality of vectors intersecting the second frame within a second block and intersecting the reference frame at a plurality of locations;
processing information associated with the plurality of locations;
determining a plurality of search areas corresponding to the plurality of locations in the second frame, each of the plurality of locations being located within at least one of the plurality of search areas;
processing information associated with the second block and the plurality of search areas;
determining a second plurality of blocks within the plurality of search areas respectively based on at least information associated with the second block and the plurality of search areas, each of the second plurality of blocks being located within at least one of the plurality of search areas;
processing information associated with the second plurality of blocks;
selecting a third block from at least the second plurality of blocks based on at least information associated with the second plurality of blocks;
determining a motion vector based on at least information associated with the third block and the second block;
wherein each of the plurality of search areas includes a plurality of reference blocks; and
wherein the determining the second plurality of blocks within the plurality of search areas respectively comprises:
for each of the plurality of search areas,
processing information associated with the plurality of reference blocks and the second block;
determining a plurality of indicators for the plurality of reference blocks respectively based on at least information associated with the plurality of reference blocks and the second block, the plurality of indicators indicating degrees of similarity between the second block and the plurality of reference blocks respectively;
processing information associated with the plurality of indicators and the plurality of reference blocks; and
determining one block most similar to the second block among all of the plurality of reference blocks based on at least information associated with the plurality of indicators, the second plurality of blocks including the one block.

17. The method of claim 16 wherein the plurality of indicators is associated with sum of absolute differences.

18. The method of claim 16 wherein the plurality of indicators is associated with rate distortion.

19. A method for performing motion estimation for a frame associated with a video signal, the method comprising:
receiving at least a reference frame, a first frame, and a second frame;
providing a first plurality of vectors, the first plurality of vectors intersecting the first frame within a first block and intersecting the reference frame within a first plurality of blocks respectively;

determining a second plurality of vectors based on at least information associated with the first plurality of vectors, the second plurality of vectors intersecting the second frame within a second block and intersecting the reference frame at a plurality of locations;

processing information associated with the plurality of locations;

determining a plurality of search areas corresponding to the plurality of locations in the second frame, each of the plurality of locations being located within at least one of the plurality of search areas;

processing information associated with the second block and the plurality of search areas;

determining a second plurality of blocks within the plurality of search areas respectively based on at least information associated with the second block and the plurality of search areas, each of the second plurality of blocks being located within at least one of the plurality of search areas;

processing information associated with the second plurality of blocks;

selecting a third block from at least the second plurality of blocks based on at least information associated with the second plurality of blocks;

determining a motion vector based on at least information associated with the third block and the second block;

wherein the second plurality of blocks is associated with a plurality of indicators respectively, the plurality of indicators indicating degrees of similarity between the second block and the second plurality of blocks respectively; and wherein the selecting the third block from the second plurality of blocks comprises:

processing information associated with the plurality of indicators and the second plurality of blocks; and determining one block most similar to the second block among all of the second plurality of blocks based on at least information associated with the plurality of indicators, the one block being the third block.

20. A method for performing motion estimation for a frame associated with a video signal, the method comprising:

receiving at least a reference frame, a first frame, and a second frame, the reference frame, the first frame, and the second frame being associated with a stream of frames related to a video signal;

providing a first plurality of vectors intersecting the first frame within a first block;

determining a second plurality of vectors based on at least information associated with the first plurality of vectors, the second plurality of vectors intersecting the second frame within a second block and intersecting the reference frame at a plurality of locations;

processing information associated with the plurality of locations;

determining a plurality of search areas corresponding to the plurality of locations in the second frame respectively;

processing information associated with the second block and the plurality of search areas;

determining a second plurality of blocks within the plurality of search areas respectively based on at least information associated with the second block and the plurality of search areas;

processing information associated with the second plurality of blocks;

selecting a third block from at least the second plurality of blocks based on at least information associated with the second plurality of blocks;

determining a motion vector based on at least information associated with the third block and the second block;

wherein:
the first block is associated with a first location in the first frame;
the second block is associated with a second location in the second frame;
the first location and the second location are the same.

21. A computer program product including a nontransitory computer-readable storage medium including instructions for performing motion estimation in one or more processors for a frame associated with a video signal, the nontransitory computer-readable storage medium comprising:

one or more instructions to cause the processor to receive at least a reference frame, a first frame, and a second frame;

one or more instructions to cause the one or more processors to receive a first plurality of vectors, the first plurality of vectors intersecting the first frame within a first block and intersecting the reference frame within a first plurality of blocks respectively;

one or more instructions to cause the one or more processors to determine a second plurality of vectors based on at least information associated with the first plurality of vectors, the second plurality of vectors intersecting the second frame within a second block and intersecting the reference frame at a plurality of locations;

one or more instructions to cause the one or more processors to process information associated with the plurality of locations;

one or more instructions to cause the one or more processors to determine a plurality of search areas corresponding to the plurality of locations in the second frame, each of the plurality of locations being located within at least one of the plurality of search areas;

one or more instructions to cause the one or more processors to process information associated with the second block and the plurality of search areas;

one or more instructions to cause the one or more processors to a second plurality of blocks within the plurality of search areas respectively based on at least information associated with the second block and the plurality of search areas, each of the second plurality of blocks being located within at least one of the plurality of search areas;

one or more instructions to cause the one or more processors to process information associated with the second plurality of blocks;

one or more instructions to cause the one or more processors to select a third block from at least the second plurality of blocks based on at least information associated with the second plurality of blocks;

one or more instructions to cause the one or more processors to determine a motion vector based on at least information associated with the third block and the second block;

wherein the reference frame includes a plurality of reference blocks; and wherein the instructions to provide the first plurality of vectors comprises:

one or more instructions to cause the one or more processors to process information associated with the plurality of reference blocks and the first block;

one or more instructions to cause the one or more processors to determine a plurality of indicators for the plurality of reference blocks respectively based on at least information associated with the plurality of reference blocks and the first block, the plurality of indicators indicating degrees of similarity between the first block and the plurality of reference blocks respectively;

one or more instructions to cause the one or more processors to process information associated with the plurality of indicators and the plurality of reference blocks;

one or more instructions to cause the one or more processors to determine at least two blocks most similar to the first block among all of the plurality of reference blocks based on at least information associated with the plurality of indicators; and one or more instructions to cause the one or more processors to select the first plurality of blocks from the plurality of reference blocks, the first plurality of blocks including the two blocks.

* * * * *